United States Patent [19]

Whitney

[11] 4,392,055
[45] Jul. 5, 1983

[54] BOTTLE FINISH AND CLOSURE COMBINATION WITH VENTING SLOTS

[75] Inventor: Ralph H. Whitney, Whitehouse, Ohio

[73] Assignee: Owens-Illinois, Inc., Toledo, Ohio

[21] Appl. No.: 295,887

[22] Filed: Aug. 24, 1981

[51] Int. Cl.³ .............................................. B65D 51/16
[52] U.S. Cl. ................................................ 215/307
[58] Field of Search ................. 215/307, 329; 220/366

[56] References Cited

U.S. PATENT DOCUMENTS

| | | |
|---|---|---|
| 682,293 | 9/1901 | Taft ........................................ 215/252 |
| 973,397 | 10/1910 | Wilzin ................................... 215/253 |
| 1,735,445 | 11/1929 | Tevander ............................. 215/295 |
| 1,784,089 | 12/1930 | Carr ...................................... 215/295 |
| 2,058,297 | 10/1936 | Carvalho . | |
| 2,776,066 | 1/1957 | Thornton ............................ 215/217 |
| 2,953,272 | 9/1960 | Mumford et al. .................... 215/260 |
| 2,990,079 | 6/1961 | Garvey ................................ 215/260 |
| 3,047,177 | 7/1962 | Poitras et al. . | |
| 3,402,842 | 9/1968 | Millian ................................ 215/217 |
| 3,610,454 | 10/1971 | Malick ................................. 215/217 |
| 3,648,874 | 3/1972 | Moller ................................. 215/252 |
| 3,692,200 | 9/1972 | Ritzenhoff .......................... 215/256 |
| 3,741,421 | 6/1973 | Wittwer .............................. 215/217 |
| 3,885,696 | 5/1975 | Eberhardt ........................... 215/337 |
| 3,963,139 | 6/1976 | Gach .................................... 215/216 |
| 4,000,825 | 1/1977 | Westfall .............................. 215/318 |
| 4,007,848 | 2/1977 | Snyder ............................. 215/307 X |
| 4,007,850 | 2/1977 | Beaugrand ..................... 215/217 X |
| 4,007,851 | 2/1977 | Walker ................................. 215/307 |

Primary Examiner—Donald F. Norton
Attorney, Agent, or Firm—John R. Nelson; Myron E. Click

[57] ABSTRACT

A combination of a threaded closure and a threaded finish of a cooperating container, with axial venting slots formed through the threaded portions of the closure and finish. The venting slots on the closure and finish are arranged to be axially aligned when the seal between the closure and finish is first broken.

8 Claims, 3 Drawing Figures

BOTTLE FINISH AND CLOSURE COMBINATION WITH VENTING SLOTS

BACKGROUND OF THE INVENTION

1. Field of the Invention

The invention relates to a combination bottle finish and closure having slots for the venting of the container head space during removal of the closure.

2. Description of the Prior Art

Twist-off molded thermoplastic closures are becoming increasingly important in the bottling industry. A problem with twist-off closures sealing containers of pressurized fluids is the possibility of the premature release of the closure during removal. During rotational removal of the closure, the seal between the closure and finish is broken, allowing head space pressure to be applied to the closure skirt. The pressure may be sufficient to overcome the limited remaining thread engagement between the closure and finish, causing the closure to be violently propelled from the finish. Attempts have been made to alleviate this hazard by the provision of venting means on the closure or finish.

For example, U.S. Pat. No. 4,007,848, to Snyder, discloses a glass bottle finish having axial slots formed through the threaded portion of the finish. U.S. Pat. No. 4,007,851, to Walker, discloses an aluminum twist off closure for containers of carbonated beverages having radially extending venting apertures formed through the skirt thereof.

The prior art also includes closures providing safety venting means for the release of excessive fluid pressure occurring at any time, not only during rotational removal of a threaded closure. Such prior art is typified by U.S. Pat. No. 2,990,079 to Garvey.

SUMMARY OF THE INVENTION

The invention provides a combination closure and finish in which axial venting slots are formed through the threaded portions of both the closure and finish and are brought into alignment by removal rotation of the closure.

A closure according to the invention comprises a unitary, molded thermoplastic closure including a disc shaped panel section and an annular skirt depending from the periphery thereof, and an annular plug depending from the inside surface of the panel. The inside annular surface of the skirt includes threads formed to engage complementary threads on the container finish. A plurality of circumferentially spaced, axially extending slots are formed through the inside threaded annular portion of the skirt. Preferably, the slots comprise interruptions in the helical thread. Two or three such axial slots are preferred.

A complementary bottle neck according to the invention comprises an annular threaded finish terminating in an annular rim. The bottle also is preferably formed from a thermoplastic material, such as polyethylene terephthalate. A plurality of axial slots are formed through the outside threaded annular portion of the neck. Preferably, the slots have a depth greater than the thread depth.

The venting slots on the closure and on the finish are located relative to the plug and the annular rim so that a closure slot is aligned with a finish slot when the seal between the plug and rim is first broken during rotational removal of the closure. The slots are circumferentially spaced such that further rotation of the closure successively brings additional pairs of slots on the finish and closure into axial alignment.

DESCRIPTION OF THE PREFERRED EMBODIMENT

Figure 1:
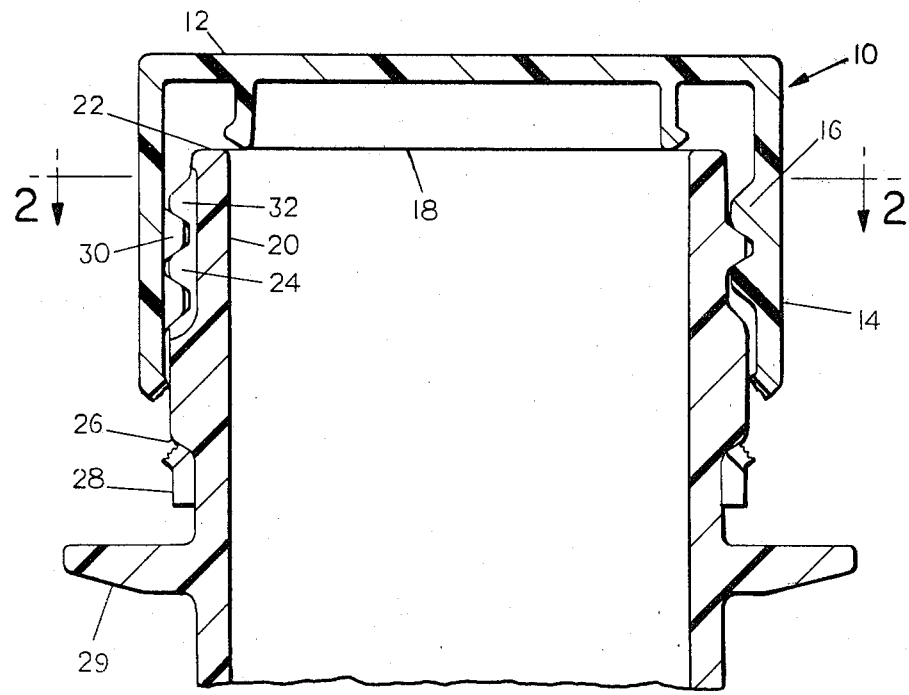
FIG. 1 is a sectional elevational view of a closure and bottle finish combination according to the present invention, illustrating the closure being removed from the finish.

As illustrated in the drawing, a closure 10 of the closure and finish combination of the instant invention comprises a disc shaped panel 12 and an integrally formed annular skirt 14 depending from the periphery thereof. The inside annular surface of the skirt 14 is provided with helical threads 16. An integral annular sealing plug 18 depends from the inside surface of the closure panel 12. The plug 18 is sized for a sealing, interference fit with the inside surface of the container 20.

The cooperating finish 20 according to the invention includes an annular rim 22. The outside annular surface of the finish has threads 24 adapted to engage the threads 16 formed on the closure skirt 14.

Preferably, the finish also includes a downwardly facing shoulder 26 which is engagable by a crimped, or heat-shrunk tamperproof band 28 provided on the lower annular end of the closure skirt 14. The finish may also include a handling flange 29.

A plurality of axially extending, circumferentially spaced slots 30 are formed through the threads 16 of the closure 10. The slots 30 have the same depth as the thread depth, and accordingly constitute interruptions in the helical thread 16.

A plurality of axially extending slots 32 are formed through the threaded portion of the finish 20. As illustrated in the drawing, the slots 32 have a greater depth than the depth of the threads 24, and thus interrupt the cylindrical surfaces between turns of the thread 16.

Figure 2:
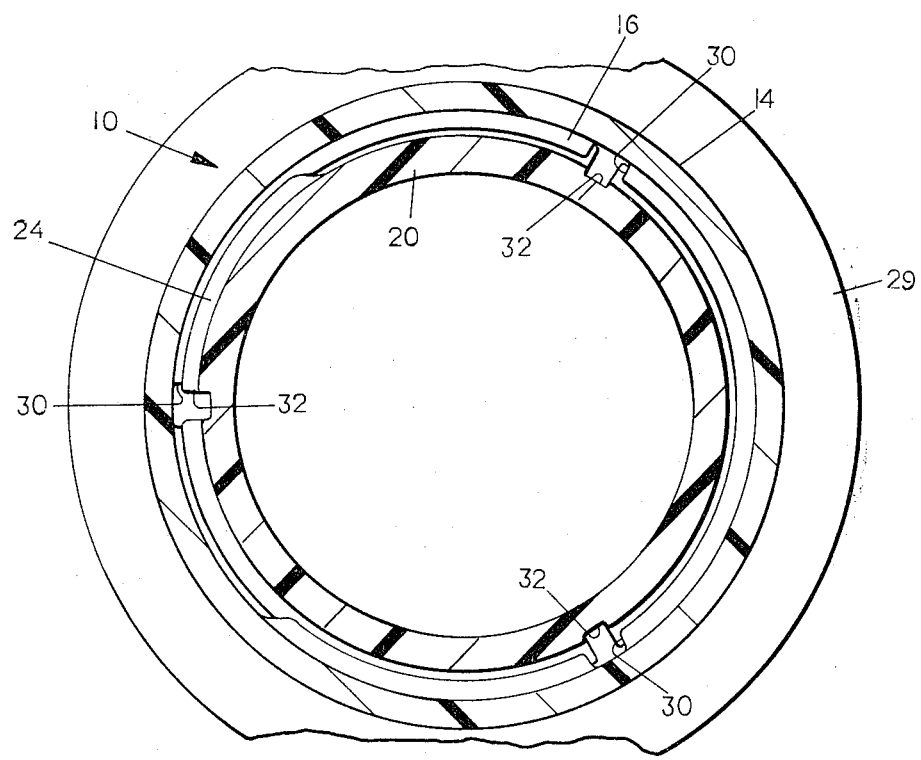
FIG. 2 is a sectional view taken on the plane 2—2 of FIG. 1.

In FIG. 1, the configuration of the closure 10 and the bottle finish 20 is illustrated during the removal of the closure 10. The tamperproof band 28 is shown separated from the skirt 14, and the sealing plug 18 has just cleared the rim 22, thereby breaking the seal and exposing the inside surface of the skirt 14 to head space pressure. The slots 30 and 32 are arranged to be axially aligned when the seal is first vented. To achieve this relationship, the slots 30 and 32 must be located during manufacture with regard to the thread pitch, the axial location of thread termini relative to the rim 22, and the depth of insertion of the plug 18 into the finish 20. For compatability with reasonable finish tolerances, one set of slots, preferably the slots 30 formed in the closure 10, is formed wider than the other set of slots 32, as illustrated in FIG. 2. The additional width of the slots 30 assures the alignment of the slots 30 with the slots 32 when the seal is first broken.

As illustrated in FIG. 2, the circumferential spacing of the slots 32 in the finish may be equal to the circumferential spacing of the slots 30 in the closure 10, to provide for a maximum venting channel when the seal is first broken. However, the preferred embodiment of the invention illustrated in FIG. 3 comprises a finish 20' and a closure 10' having axial slots arranged to provide sequential alignment of pairs of slots during removal of the closure 10'.

Figure 3:
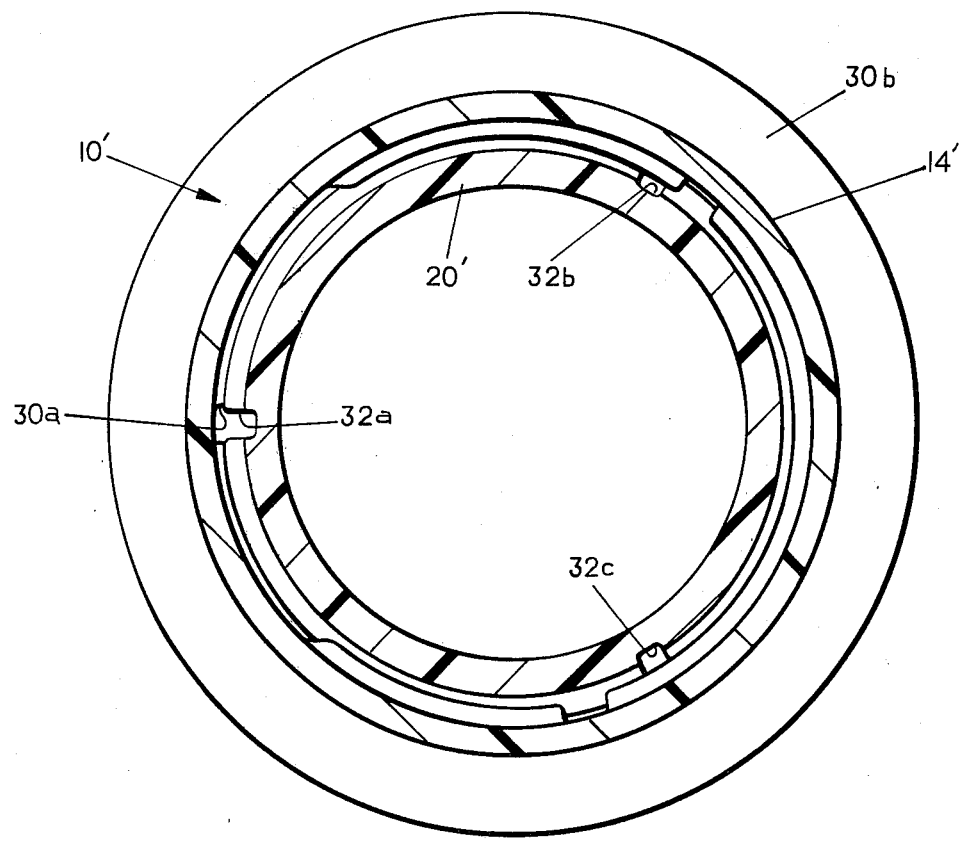
FIG. 3 is a sectional view similar to FIG. 2, illustrating the circumferential spacing of venting slots in the preferred embodiment.

As illustrated in FIG. 3, axial slots 32a, 32b, and 32c are formed in the finish 20' at an equal circumferential spacing. One axial slot 30a formed through the skirt 14' of the closure 10' is located to be axially aligned with the slot 32a when the seal between the plug and the finish 20' is first broken. The axial slots 30b and 30c are circumferentially located to be sequentially aligned with the slots 32b and 32c as the closure 10' is rotated during removal. Preferably, the slots are so arranged that the slot 30b becomes aligned with slot 32b as the slots 30a and 32a are still overlapping, and passing out of alignment. Similarly, the next set of slots 32c and 30c are brought into alignment by rotation of the closure 10 as the slots 30b and 32b are passing out of alignment. This preferred arrangement permits continuous venting through sequentially aligned pairs of slots during a relatively large range of angular postion of the closure 10' on the finish 20'.

The combination closure and bottle finish described allows for a rapid venting of the container head space upon initial opening rotation of the closure. Such venting would otherwise be obstructed by the remaining thread engagement. The provision of axial venting slots through the threads of both the finish 20 and the closure 10 provides a larger venting passage than prior art designs, while retaining sufficient thread strength. Due to the depth of the slots 32a, 32b and 32c beyond the depth of the threads 24, some venting of head space through the slots can occur continuously, even when the slots 32 are not aligned with slots 30a, 30b, and 30c. However, the axial alignment of the slots 30a and 32a when the seal is first broken assures full and effective venting of the head space at the critical point in the removal of the closure 10. As rotation of the closure 10 continues during the removal, further pairs of slots are progressively aligned, assuring full venting.

Modifications of the invention will be apparent to those skilled in the art, and it is intended that the scope of the invention be determined by the appended claims.

What is claimed is:

1. In combination, a unitary molded thermoplastic closure comprising a disc shaped panel section, an annular skirt depending from the periphery thereof, helical threads formed on the inside annular surface of said skirt, and circumferentially spaced, axially extending slots formed through the threads of said skirt; and a cooperating container comprising an annular finish terminating in an annular rim, helical threads formed on the outside annular surface of said finish and cooperating with said threads on said skirt, means for effecting sealing engagement between said closure and said container finish, and a plurality of circumferentially spaced axially extending slots formed in the outside annular threaded surface of said finish, at least one of said closure slots being alignable with one of said finish slots by opening rotation of said closure sufficient to disengage said sealing means and permit venting of said container.

2. The combination closure and container defined in claim 1 wherein said sealing means comprises an integral annular sealing plug depending from the inside surface of said panel and constructed and arranged to achieve a sealing interference fit within the inside annular surface of said finish.

3. The combination closure and container defined in claim 1 wherein the circumferential spacing of said closure slots corresponds to the circumferential spacing of said slots in said finish.

4. The combination closure and container defined in claim 1 wherein the axial slots in said finish have a depth greater than the depth of said threads.

5. The combination closure and container defined in claim 1 wherein the depth of said axial closure slots is equal to the depth of the threads formed in said skirt.

6. The combination closure and container defined in claim 1 wherein said closure slots are circumferentially wider than the slots formed in said finish.

7. The combination closure and container defined in claim 1 wherein said closure and finish slots are circumferentially spaced such that a first slot in said closure and a first slot in said finish are radially aligned during rotational removal of said closure from said finish when the seal formed by said sealing means against said finish is first broken, and additional ones of said slots in said closure and said finish are respectively sequentially aligned during further rotation.

8. The combination closure and container defined in claim 7 wherein said closure and finish slots are so aligned that a second slot in said closure and a second slot in said finish become radially aligned during rotation of said closure while said first slots are still aligned, whereby continuous venting through pairs of successively aligned slots is provided.

* * * * *